Figure 2A:
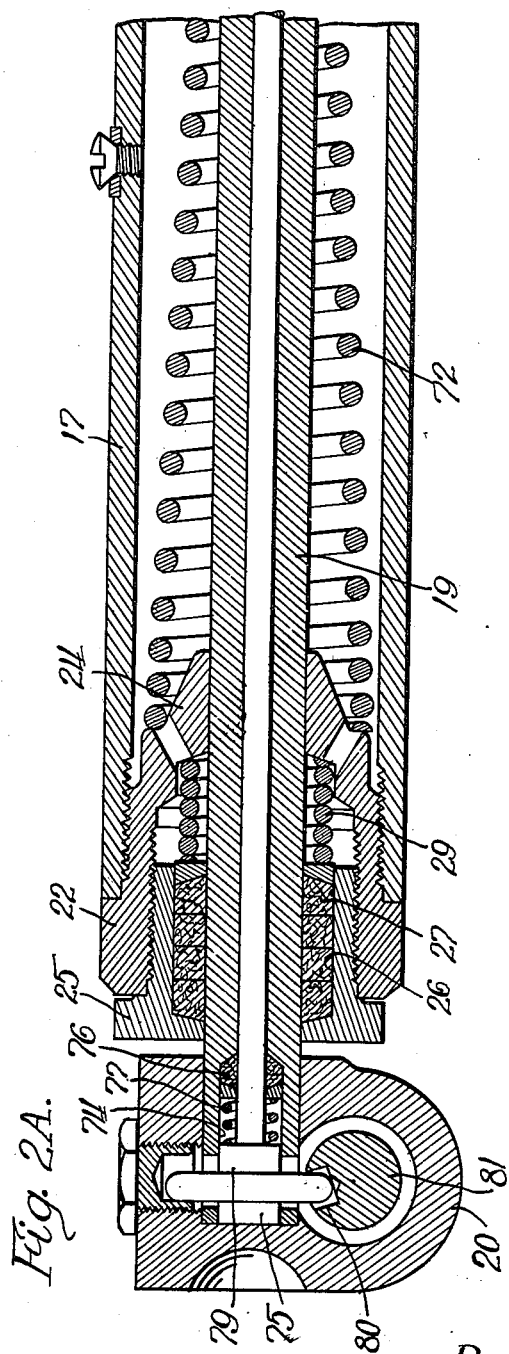

Feb. 10, 1942. S. O. HARLAN 2,272,705
GOVERNOR FOR FLUID FLOW
Filed May 31, 1940 3 Sheets-Sheet 1
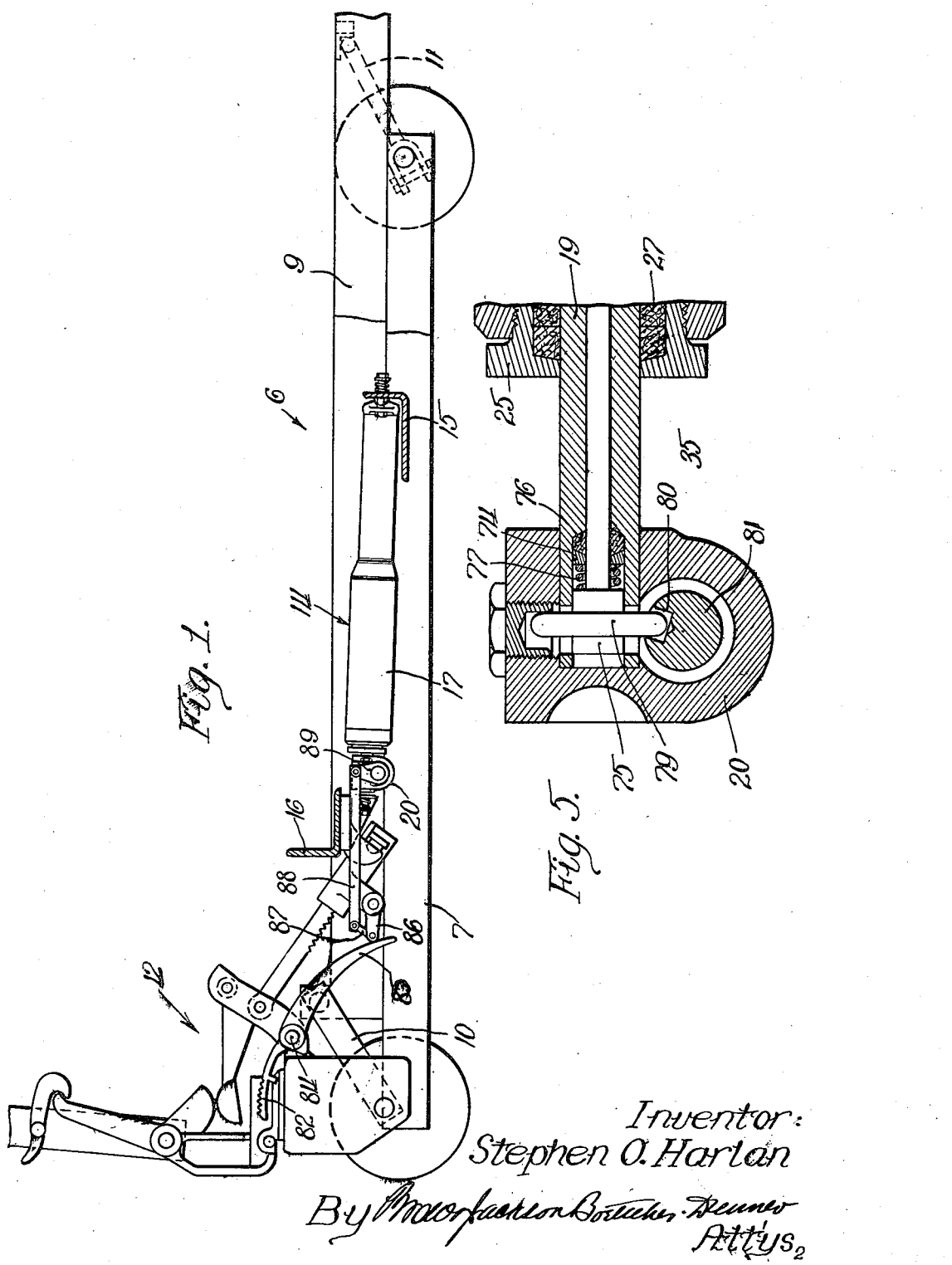
Inventor:
Stephen O. Harlan Feb. 10, 1942.   S. O. HARLAN   2,272,705
GOVERNOR FOR FLUID FLOW
Filed May 31, 1940   3 Sheets-Sheet 2

Inventor:
Stephen O. Harlan
By *[signature]*
Attys

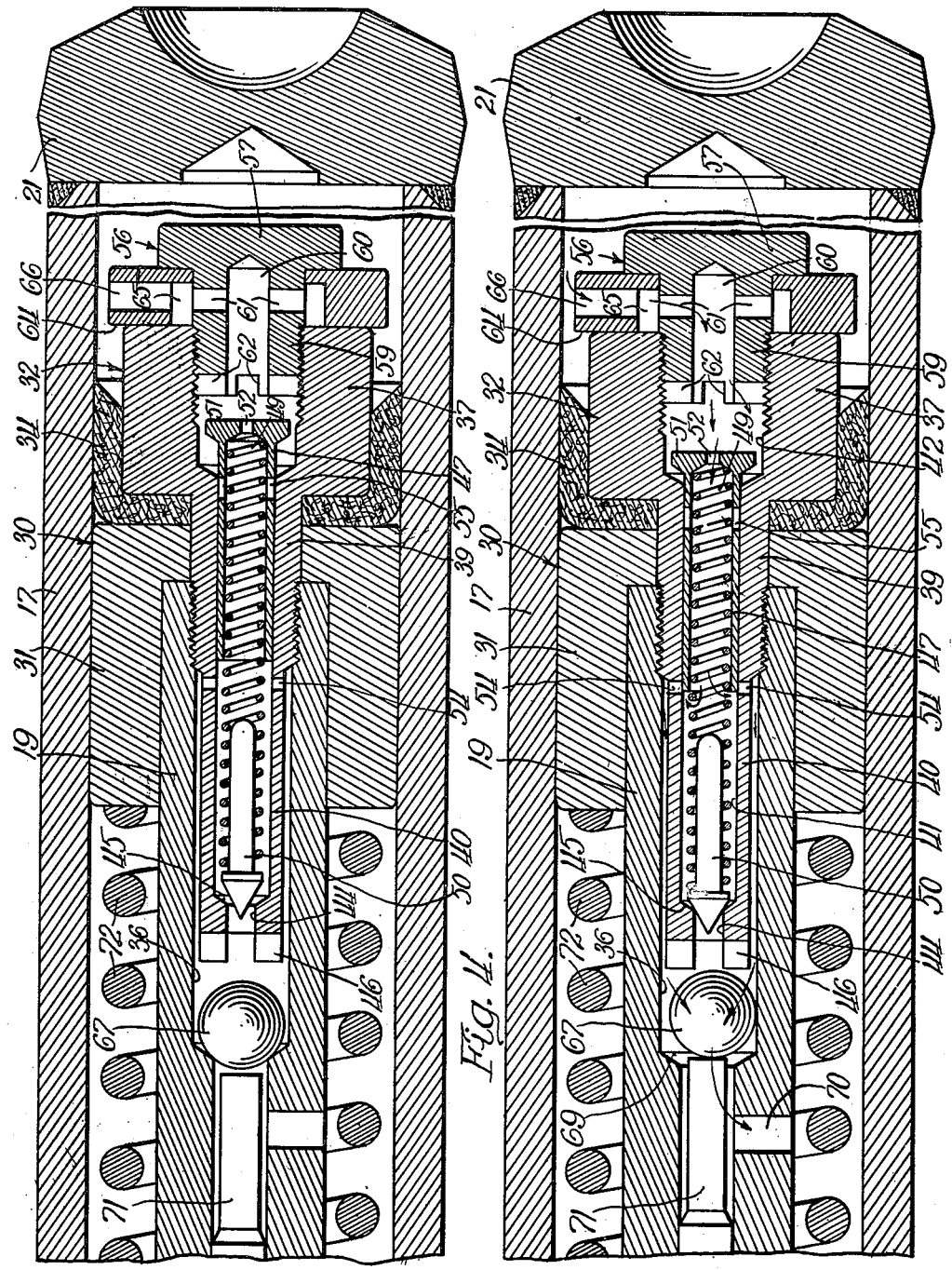

Patented Feb. 10, 1942

2,272,705

UNITED STATES PATENT OFFICE 2,272,705

GOVERNOR FOR FLUID FLOW

Stephen O. Harlan, Elmhurst, Ill., assignor to Barrett-Cravens Company, Chicago, Ill., a corporation of Illinois Application May 31, 1940, Serial No. 338,072

17 Claims. (Cl. 188—96)

This invention relates to fluid flow governors. The particular embodiment herein disclosed and illustrated is an oil flow governor for controlling the lowering of a platform of a lift truck. This embodiment is illustrative and not limiting. The governor per se has general utility. The embodiment in which it is here disclosed has certain novel features and combinations peculiarly advantageous in the art of lift trucks and the like.

The essential problem is to provide for a uniform rate of flow of fluid out of a chamber under variations of pressure. Thus, in a lift truck the load may vary from the unloaded platform to a heavily loaded platform. The desideratum is to allow lowering of the platform at a predetermined rate even under wide variations of load and at the same time to be free enough to allow the unloaded platform to lower under its own weight only.

According to my invention the fluid, in this case oil, is permitted to escape from the pressure chamber, i. e., in this case the cylinder, through a constantly open orifice into a control or intermediate chamber which has a regulable orifice, in this case a valved outlet opening leading to a sump or the like receiving chamber. The rate of flow through an orifice alone varies with the pressure difference upon the two sides of the orifice.

Between the pressure chamber and the intermediate or control chamber I dispose a piston or its equivalent, which piston, by its position, varies the size of opening of the regulable orifice. In this case the piston moves a valve to obstruct the outlet opening from the control chamber to the sump or reservoir, thereby providing a second restriction to flow of the oil which passes through the first or fixed orifice. The position of the piston is controlled by a loading spring which tends to move the control wave in a direction to open the outlet opening. The piston is subjected on opposite sides to the pressure in the pressure chamber and to the pressure in the control chamber, respectively. The preponderance of pressures during the discharge of oil from the pressure chamber is in the direction to move the control valve toward closed position and motion or displacement in that direction is opposed by the loading spring.

Now it can be seen that the first or fixed orifice offers a resistance to flow which is a function of the difference in pressure between the pressure in the pressure chamber and the pressure in the control chamber. The pressure in the control chamber is in turn dependent upon the position of the valve and that is positioned by the pressure difference between the two chambers and the control spring. In brief, by regulating the pressure difference upon opposite sides of the orifice so that it is a constant or substantially so the rate of escape of oil from the pressure chamber becomes a constant or substantially so.

Flow is a function of pressure difference upon the orifice. Choking of the outlet is also a function of the same pressure difference. Choking of the outlet reduces flow through the orifice by backing up the pressure in the control chamber. Hence it can be seen that except for the very slight difference in compressive strength of the spring in different positions of compression the flow through the governor is uniform for all loads.

The governor may be embodied in a wide variety of forms and in the present embodiment I have combined it with an automatic check valve, a manually controlled release valve, and a return flow valve, all as will more clearly appear hereinafter.

The present invention may be embodied in a governor comprising three chambers, i. e. a pressure chamber, an intermediate or control chamber, and a third or reservoir chamber with means operable for limiting the rate of fluid flow from the pressure chamber to the third chamber when the pressure in the pressure chamber exceeds that in the third chamber, and for permitting substantially free flow of fluid in the reverse direction, that is, from the third chamber to the pressure chamber, when the pressure in the third chamber exceeds that in the pressure chamber. The fluid governor may be incorporated in a check for a lift truck in a manner so that when the platform is being elevated the fluid will flow freely from the third chamber to the pressure chamber thus eliminating any substantial resistance of the fluid in raising the platform. When the platform is being lowered, the means referred to is effective to allow the platform to lower at a predetermined constant rate. Further, I contemplate the provision of a hydraulic check having a plunger operable in a cylinder and, in addition to the above, comprises a shutoff chamber adapted to be interposed between the intermediate and reservoir chamber, there being suitable lift valve means interposed between the shutoff and reservoir chambers operative when the pressure in the shutoff chamber exceeds the pressure in the reservoir chamber to close the valve, and operable when the pressure in the reservoir chamber exceeds the pressure in the first chamber to open the valve. With the latter construction the platform of a lift truck, for example, may be maintained in elevated or raised position without the use of separate mechanically operable locking means for that purpose, and to permit the plunger in the cylinder to be pulled outwardly freely when the platform is being elevated.

While the outlet preferably discharges the escaping oil into a sump or reservoir where the pressure is substantially constant, as for example, by communication with atmosphere, this is not essential. The governor may be employed in a pipe line or in a situation where there is back pressure upon the discharge outlet.

Under certain conditions the pressure sensitive element may obstruct the first orifice instead of the second or it may act upon both.

Now, in order to acquaint those skilled in the art with the manner of constructing and operating my invention, I shall describe, in conjunction with the accompanying drawings which form a part of this specification, a specific embodiment of the invention.

Figure 2B:
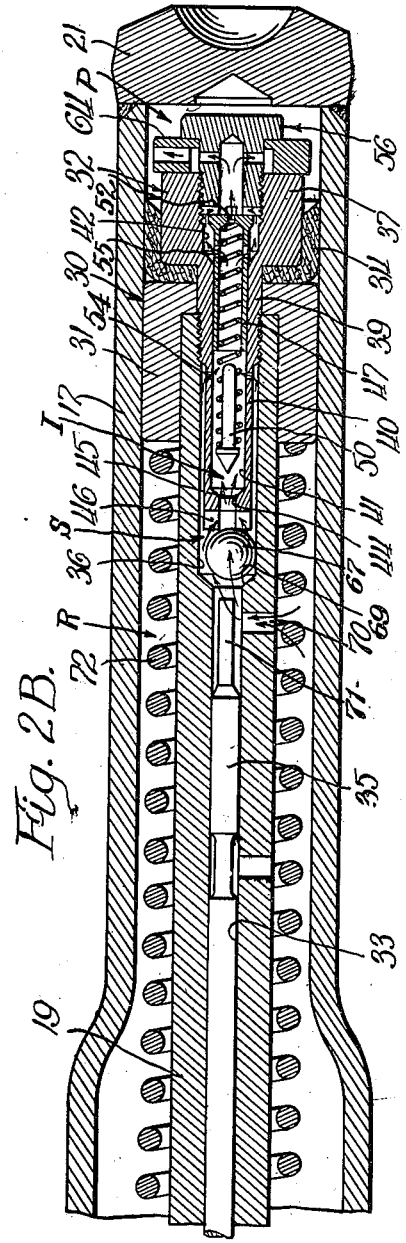

In the drawings:

Figure 1 is a side elevational view of a lift truck employing the hydraulic check of my invention;

Figures 2A and 2B, taken together, comprise a horizontal sectional view of the hydraulic check of my invention;

Figures 3 and 4 are enlarged sectional views similar to Figure 2B, showing the operating parts of the hydraulic check in various positions; and Figure 5 is a sectional view similar to Figure 2A showing the valve release device in operative position.

Referring now in detail to the drawings, the reference numeral 6 indicates generally a lift truck which comprises a lower frame 7 mounted on wheels, and an upper elevating platform 9 mounted on links 10 and 11 which are pivoted to the lower frame and which serve to elevate the platform 9 as the latter is moved to the left from the position shown in Figure 1. Elevating mechanism is indicated generally at 12, this elevating mechanism serving to raise the platform 9, drawing it to the left from the position shown, thus rotating the links 10 and 11 about their pivots in a counterclockwise direction, and raising the platform. The lifting mechanism is referred to only generally, since this does not form a part of my invention.

The hydraulic check embodying my invention is indicated generally at 14, one end thereof being secured to an angle iron 15 forming a cross bar on the lower frame 7, the other end being secured to an angle iron 16 mounted across the elevating platform 9.

The hydraulic check per se comprises a cylinder 17 and a plunger comprising a piston rod 19 and a piston 30 reciprocable therein. On the outer end of the piston rod 19 is mounted a head 20 by which the check is mounted on the angle iron 16. As the platform 9 is raised, the piston rod 19 is extended out of the cylinder, the cylinder being fixed to the angle iron 15. Also shown in Figure 1 is the means employed for releasing valve means within the cylinder, which will be referred to later.

Referring now to Figures 2A and 2B, the cylinder 17 is shown closed at one end by a head member 21 welded or otherwise suitably secured to the cylinder. The other end is closed by a packing gland assembly comprising an end member 22 threaded into the cylinder and provided with a spider 24 adapted for supporting and guiding the piston rod 19. Threaded into the end member 22 is a packing nut 25 counterbored as indicated at 26 to receive packing material 27 held in place by a compression spring 29 interposed between it and the spider 24.

The piston 30 secured to the inner end of the piston rod 19 comprises a cap 31 fitted over the rod and held in place by an insert 32 threaded into the end of the rod 19, this insert also holding in place a leather washer 34 which seals the piston against the passage of oil thereby.

As shown in the drawings, the piston rod 19 is provided with a bore 33 extending throughout its length to receive a valve release rod 35, and is counterbored as shown at 36 to receive the insert 32.

The insert 32 consists of an enlarged annular portion 37, and a threaded sleeve 39 which threads into the counterbore 36 of the piston rod. A reduced portion 40 of the sleeve 39 extends into the greater part of the counterbore 36 and is of less diameter than the counterbore leaving a space for the passage of oil. The insert 32 is bored as shown at 41 and is provided at its outer end with a counterbore 42. At its inner end the sleeve 39 has a small diameter bore 44 which, with the bore 41, forms a check valve seat 45. The sleeve 39 is provided with a forked portion 46 which is formed by cutting radial slots in the end of the sleeve.

Slidable within the bore 41 of the sleeve 39 is a sleeve 47 which is also bored and provided with lateral slide check valve openings 55, which together with the sleeve 39 comprise a slide check valve means, the openings 55 being adapted to be opened or closed depending upon the relative position of sleeve 47 with respect to sleeve 39. The purpose of this slide check valve means will be more fully described hereinafter. Resting within the bore of the sleeve 47 is a spring 49 which carries a needle-valve member 50 which together with the valve seat 45 comprises a check valve. The outer end of the sleeve 47 is provided with an enlarged head portion 51 with an opening or fluid flow controlling orifice 52 of predetermined size therein. The sleeve 47, spring 49, and needle valve member 50 may be referred to collectively as a closure element, since their joint purpose is to close to various extents the openings in the sleeve 39.

The outer end of the insert 32 is closed by a closure member 56 which comprises an enlarged annular head 57 and a reduced shank portion 59 which threads into the counterbore 42. The closure member 56 is provided with an axial bore 60 and radial passages 61. At the inner end of the reduced shank 59 are radial passages 62, disposed at right angles to each other. Securely held between the enlarged head 57 and the enlarged portion 37 of the insert 32 is a ring 64 which is provided with a circumferential groove 65 communicating with the radial openings 61, and a radial opening 66. The ring 64 is positioned so that the opening 66 extends upwardly to prevent the device from becoming air bound.

The sleeve 47, spring 49 and needle valve member 50, in assembled relation have such a limited range of movement between the valve seat 45 and the insert 56 that the needle valve member 50 will not drop out of the spring 49.

Within the bore 36 of the piston rod and inwardly of the sleeve 39 is a check valve means comprising a ball valve member 67 adapted to seat against the valve seat 69 formed by the bore 33 and the counterbore 36 in the piston rod 19. The sleeve 39 and the counterbore 36 are of such length with relation to each other that the ball valve member 67 has limited movement between the inner end of the sleeve 39 and valve seat 69. The piston rod is provided with a lateral opening 70 to permit passage of oil from outside the piston into the bore 36, the inner end of the valve release rod 35 being reduced as shown at 71 to permit passage of oil thereby.

Surrounding the piston rod 19 is a compression spring 72 interposed between the spider 24 and the piston 31, biasing the piston to contracted position in the cylinder.

The outer end of the piston rod 19, secured in the head 20, is provided with a counterbore 74 (Figure 2A). The outer end of the valve release rod 35 is provided with an enlarged head 75 which slides in the counterbore 74. At the inner end of the counterbore 74 is an oil-sealing packing 76, and positioned between the head 75 and the packing means is a compression spring 77 which serves to hold the packing means 76 in position and to bias the valve release rod 35 to retracted position, that is, to the left as shown in Figures 2A and 2B. A pin 79 extends through the head 75 and into a notch 80 cut in the shaft 81. Rotation of the shaft 81 in a clockwise direction will force the valve release rod 35 to the right, and of course rotation of the shaft 81 in a counterclockwise direction will force the valve release rod to the left. Figure 5 shows the operating parts of the valve release device in operative position, the shaft 81 being shown rotated in a clockwise direction from its former position, and the valve release rod forced through the piston, or to the right as shown in this figure. The effect of this action is shown in Figure 4, the end of the rod 35 forcing the ball valve member 67 away from the valve seat 69.

Referring again to Figure 1, a treadle 82 is shown pivoted at 84 on the framework of the lift truck, and mounted on the same pivot to rotate with the treadle 82 is an arcuate member 85 adapted to engage the crank arm 86. On pressing the treadle 82 downwardly, it will rotate in a counterclockwise direction, and also the arcuate member 85 will rotate in the same direction engaging the crank arm 86 rotating it in a clockwise direction. Through this operation, links 87 and 88 will be forced to the right, as shown in Figure 1, thus rotating the crank arm 89 in a clockwise direction. The crank arm 89 is secured to the shaft 81 and it will thus be seen that the valve release rod 35 may be operated by actuation of the treadle 82.

In the drawings, Figure 2B, it will be seen that the check comprises four chambers, namely, a pressure chamber P formed by the cylinder 17 to the right of piston 30, an intermediate chamber I comprising the bore 41 of sleeve 39 and the interior of the slidable valve member 47, a shutoff chamber S formed by the bore 36 in piston rod 19, and a reservoir or outlet chamber R between the piston rod 19 and the cylinder 17.

Figures 2A and 2B show the device in contracted position, with the piston being drawn outwardly. The cylinder being enclosed, on this movement of the piston the oil will pass from the reservoir R from the left of the piston to the right thereof into pressure chamber P. This is accomplished through a passageway between the reservoir chamber R and shutoff chamber S defined by the opening 70, the annular space defined by extension 71 and bore 33 of piston rod 19, the bore 36 of piston rod 19, and the check valve means comprising valve seat 69 and the ball valve 67. Thereafter the fluid will flow into intermediate chamber I through the passageway defined by bore 44 in sleeve 39 and the check valve comprising valve seat 45 and valve 50, and also through the openings or controllable ports 54. The oil in the intermediate chamber I will force the sleeve or slidable valve member 47 into bore 42 of the member 32 and establish communication of the openings 55 with the pressure chamber P through the several ducts of head 56 and ring 64. The forked conformation of the inner end of the insert 32 allows the oil to pass around the ball valve 67 and into bore 44, when the ball valve 67 is disposed to the right as viewed in Figure 2B. It will be obvious that, if desired, the check valve means comprising valve member 67 and valve seat 69 may be dispensed with in which event the reservoir chamber R and the shutoff chamber I in effect become a single chamber. The force of the oil will force the needle valve member 50 away from the seat 45 and also will force the sleeve 47 to its outermost position against the insert 56. With the sleeve in this position, the openings 55 in the sleeve allow free flow of the oil so that there is a little resistance to the piston being moved to the left. The forked conformation of the inner end of insert 56 formed by the radial openings 62 will permit oil to pass around the head 51 of the sleeve 47 so that passage of oil into bore 60 will not be restricted by the size of the opening or fixed orifice 52.

This is the action which occurs when the elevating platform of the lift truck is being lifted. The head 20 being secured to the elevating platform and the head 21 of the cylinder being secured to the lower frame of the truck, raising of the elevating platform will extend the piston to the left as shown in Figure 1. When the piston is forced inwardly of the cylinder, the rush of oil in the reverse direction will close the check valve means comprising the ball member 67 and the seat 69 shutting off communication between the shutoff chamber S and the reservoir chamber R. Since this check valve must be open for oil to escape from one side of the piston to the other, the piston may be held in any position when this check valve is closed.

When force is exerted on the piston and the check valve means between the shutoff chamber S and reservoir chamber R is closed, as shown in Figure 3, all the moving parts are in equilibrium and there is no passage of oil from one side of the piston to the other. In this condition, the sleeve 47, spring 49 and needle valve member 50 are "floating," that is, there is no force exerted upon them and they may rest anywhere within their limits of movement. The spring 49 is of such length that it will not stress sleeve 47 and needle valve member 50 both to their seats.

Figure 4 shows the check valve means comprising ball valve 67 and seat 69 between the reservoir and shutoff chambers released allowing the device to contract and the elevating platform to descend. The treadle 82 is operated, thus operating the valve release rod 35, forcing it to the right and unseating the ball valve member 67, as shown in this figure. The oil is then permitted to flow from the pressure chamber R at the right of the cylinder through the piston, allowing the piston to assume contracted position within the cylinder. The flow of oil through the piston from the pressure chamber, as shown by the arrows, will exert a force against the head 51 of the sleeve 47, forcing it into the bore 41 of the sleeve 39. This movement of the sleeve 47 also forces the needle valve member 50 against the seat 45, closing the bore 44 against passage of oil. Also when the sleeve 47 is forced into the bore 41, the passages 55 are closed, as indicated by their position in Figure 4. Thus the check valve means between the pressure chamber P and the intermediate chamber I, and the check valve means between the intermediate chamber and the shutoff chamber are both moved to their closed positions. Under these circumstances, the spring 49 is in a state of compression, and reacts on the sleeve 47 against the force of the oil on the head 51 of the sleeve 47. The sleeve 47 is of proper length to obstruct the ports 54 and close them to a degree necessary for proper operation of the device. With a considerable force exerted on the head 51 of the sleeve 47, the sleeve will be forced farther into the bore 41, thus closing off the openings or ports 54 substantially. If the exerted force is relatively light, the sleeve 47 will be forced into the bore to a lesser extent, thus establishing communication between the intermediate chamber I and shutoff chamber S through the ports 54 which will be only slightly obstructed by the slidable valve member 47. It is thus apparent that the degree of the effective area of opening of the ports 54 is inversely proportional to the load exerted on the piston, i. e., with a heavy load the opening will be relatively small in that the port 54 will be substantially obstructed, and with a light load the area of opening will be relatively large since the ports 54 will be slightly obstructed. Under great force the oil will pass through the opening at greater velocity or pressure than when under a lesser force exerted on the piston, and with the openings inversely proportional to the forces exerted on the piston the total flow of oil in either case will be the same, thus allowing the device to contract and the load on the truck to descend at a uniform rate. The action of the compression spring 72 aids materially in contracting the device, which may often be convenient in the descent of an unloaded platform.

It is easily seen that the openings or ports 54 will never be completely closed. Assuming that a great inrush of oil causes the sleeve 47 to be forced beyond the openings or ports 54, there would be no passage of oil at all and, therefore, no force exerted on the sleeve 47. Under such condition the spring 49 will be able to exert its full force and force the sleeve 47 back, allowing the openings or ports 54 to be partially opened. Oil then will pass through, forcing the sleeve back to a position of equilibrium for the particular load where a flow of oil uniform for all loads will take place.

The surface of the head 51 of the sleeve 47, together with the orifice 52 therein, both taken in connection with the length and strength of the spring 49, can be so proportioned with relation to each other that the flow of oil may be regulated to any desired rate.

The release check as thus shown and described embodying the shutoff chamber S may be employed as a substitute for pawl and ratchet holding means of lifting devices such as lift trucks, elevators, and the like.

The assembly comprising the insert 32, ring 64 and closure member 56, with the enclosed valve members, instead of being carried by a piston in a release check may be placed in an oil line and accomplish the same result, viz., to maintain the flow of oil constant regardless of the pressure on the oil.

While I have shown one adaptation of the invention as applied to lift trucks, it is also conceivable that it might be employed on other devices, as for example, elevators which are used for loading and unloading at various levels.

While I have disclosed a particular form of the invention, I intend that the details shown and described shall not be limiting but illustrative, and that all changes to meet particular adaptations, and substitution of equivalents, shall be within the scope and purport of the invention as encompassed in the appended claims.

I claim:

1. In combination, a valve comprising an outer sleeve with openings therein, an inner sleeve slidable in said outer sleeve and adapted to partially close said openings in said outer sleeve, said inner sleeve having an end opening and lateral openings therein, said lateral openings in said inner sleeve being closed when said openings in said outer sleeve are partially closed.

2. In combination, a valve comprising an outer sleeve with openings therein, an inner sleeve slidable in said outer sleeve, a spring in said inner sleeve, a needle valve member carried by said spring, said inner sleeve, spring, and needle valve member acting as a closure member for said openings in said outer sleeve.

3. In combination, an enclosed fluid containing cylinder, a piston reciprocable therein and provided with a passage to permit the flow of fluid therethrough, and valve means in said passage operative to maintain a uniform flow of fluid therethrough, said valve means comprising a sleeve with an end opening and lateral openings, and a closure element in said sleeve adapted to entirely close said end opening and partially close said lateral openings.

4. In combination, an enclosed fluid containing cylinder, a piston reciprocable therein and provided with a passage to permit the flow of fluid therethrough, and valve means in said passage operative to maintain a uniform flow of fluid therethrough, said valve means comprising a sleeve with an end opening and lateral openings, and a compressible closure element in said sleeve adapted to entirely close said end opening and partially close said lateral openings to a degree proportional to the force exerted on the piston.

5. In combination, an enclosed fluid containing cylinder, a piston reciprocable therein and provided with a passage to permit the flow of fluid therethrough, and valve means in said passage operative to maintain a uniform flow of fluid therethrough, said valve means comprising an outer sleeve and an inner sleeve, both said sleeves having a plurality of openings permitting the free flow of fluid in one direction, part of said openings being completely closed and others being partially closed when the fluid flows in the reverse direction.

6. In combination, an enclosed fluid containing cylinder, a piston reciprocable therein and provided with a passage to permit the flow of fluid therethrough, and valve means in said passage to control said fluid flow, said valve means comprising an outer sleeve having an end opening and lateral openings, a needle valve in said outer sleeve adapted to close said end opening, an inner sleeve in said outer sleeve adapted to close said lateral openings, all of said openings being open to permit free flow of fluid in one direction, and said end opening being completely closed and said lateral openings being partially closed when the fluid flows in the reverse direction.

7. In combination, an enclosed fluid containing cylinder, a piston reciprocable therein and provided with a passage to permit the flow of fluid therethrough, and valve means in said passage for controlling the flow of fluid therethrough, said valve means comprising an outer sleeve with openings therein, an inner sleeve slidable in said outer sleeve, said inner sleeve having lateral openings to permit the free flow of fluid in one direction, said lateral openings being closed when the fluid flows in the reverse direction, said inner sleeve having an end opening of such restriction that when the fluid flows in said reverse direction the fluid forces said inner sleeve to partially close said openings in said outer sleeve.

8. In a fluid check the combination of a cylinder, a piston and piston rod reciprocable therein, the cylinder providing a pressure chamber on one side of the piston and an outlet chamber on the opposite side thereof, there being an axial passage through said piston and piston rod for the escape of fluid from said pressure chamber to said outlet chamber, said passage comprising a fixed orifice and a regulatable orifice with a control chamber therebetween, and an outlet port, said fixed orifice, regulatable orifice and outlet port being in series relation for the escape of fluid from the pressure chamber to the outlet chamber, valve means for said outlet port for stopping the flow of fluid therethrough, a slidable valve member for regulating said regulatable orifice, said fixed orifice being in said slidable valve member and offering resistance to the flow of fluid therethrough, the pressure of the fluid flowing through said fixed orifice actuating said slidable valve member tending to close said regulatable orifice, spring means acting on said slidable valve member against the pressure of the fluid, and means extending through said piston rod for actuating said valve means to open said outlet port.

9. In a fluid check the combination of a cylinder, a piston and piston rod reciprocable therein, the cylinder providing a pressure chamber on one side of the piston and an outlet chamber on the opposite side thereof, there being a passage through said piston and a part of said piston rod for the escape of fluid from said pressure chamber to said outlet chamber, a regulatable orifice in said passage, automatic means responsive to the pressure in said chamber for regulating the size of said regulatable orifice, and manually operable means for permitting the flow of fluid through said orifice.

10. In a hydraulic check, a closed end cylinder, a piston in the cylinder dividing the cylinder into a pressure chamber and a reservoir, a piston rod extending out of the cylinder, there being an axial passageway through the piston and through the piston rod and a lateral port leading from said passageway to the reservoir, said passageway having two valves in series between the pressure chamber and the reservoir, the first valve being an automatic flow regulating valve and the second being a shut-off valve of the lift type and a rod extending through the outer end of said passageway in the piston rod to operate the lift valve.

11. In a hydraulic check, a closed end cylinder, a piston in the cylinder dividing the cylinder into a pressure chamber and a reservoir, a piston rod extending out of the cylinder, there being an axial passageway through the piston and through the piston rod and a lateral port leading from said passageway to the reservoir, said passageway having a fixed orifice, a regulatable orifice and an outlet port in series relation for the escape of fluid from said pressure chamber to said reservoir, a slidable valve for regulating said regulatable orifice, said fixed orifice being in said slidable valve member and offering resistance to the flow of fluid therethrough, the flow of fluid actuating said slidable valve member and thereby regulating said regulatable orifice, a shut-off valve of the lift type in said outlet port, and a rod extending through the outer end of said passageway in the piston rod to operate the lift valve.

12. In a hydraulic check, a closed end cylinder, a piston in the cylinder dividing the cylinder into a pressure chamber and a reservoir, a piston rod extending out of the cylinder, there being an axial passageway through the piston and through the piston rod and a lateral port leading from said passageway to the reservoir, said passageway having a plurality of inlet orifices, a plurality of intermediate orifices, and an outlet port, a shut-off valve in said outlet port, manual means for lifting said shut-off valve, a slidable valve member for regulating certain of said intermediate orifices and including a check valve for closing other of said intermediate orifices, said inlet orifices being in said slidable valve member, said slidable valve member being responsive to the flow of fluid through said passageway whereby when said shut-off valve is lifted fluid escaping through said passageway from said pressure chamber to said reservoir actuates said slidable valve member and closes certain of said inlet orifices and partially obstructs certain of said intermediate orifices, and on reverse flow of fluid through said passageway said outlet port and all of said intermediate orifices and said inlet orifices are open permitting free flow of fluid therethrough.

13. A fluid governor comprising a pressure chamber, an intermediate chamber, and a third chamber, means for limiting the rate of fluid flow from said pressure chamber through said intermediate chamber to said third chamber when the pressure in said pressure chamber exceeds that in said third chamber, and for permitting free flow of fluid from said third chamber through said intermediate chamber into said pressure chamber when the fluid pressure in said third chamber exceeds that in said pressure chamber, said means comprising a fixed orifice between said pressure chamber and said intermediate chamber, a controllable port between said intermediate chamber and said third chamber, a fluid pressure controlled element subject to the differential in pressure between that in said pressure chamber and that in said intermediate chamber for providing a graduated obstruction of said port in accordance with the excess of pressure in said pressure chamber over that in said intermediate chamber, a check valve means between said pressure chamber and said intermediate chamber, said valve opening upon excess of pressure in said intermediate chamber above that in said pressure chamber, and a check valve means between said intermediate chamber and said third chamber, said last named check valve means opening upon excess of pressure in said third chamber above that in said intermediate chamber.

14. The combination of claim 13, comprising a cylinder and a piston fitting therein, said pressure chamber and said third chamber being disposed in said cylinder on opposite sides of said piston, said intermediate chamber and said means being disposed in the piston.

15. In a hydraulic check, the combination of a cylinder closed at its lower end, a plunger comprising a piston movable in the cylinder, and a piston rod for the piston, there being four fluid chambers in the check, namely, a pressure chamber formed between the piston and the closed end of the cylinder, an intermediate chamber formed in the plunger, a shut-off chamber formed in the plunger, and a reservoir chamber formed between the rod and the cylinder above the piston, there being a fluid flow controlling orifice of predetermined size between said pressure chamber and said intermediate chamber, there being a controllable port between said intermediate chamber and said shut-off chamber, a spring loaded pressure differential member movable by excess of pressure in said pressure chamber over that in said intermediate chamber for obstructing said port, there being a passageway between said shut-off chamber and said reservoir chamber comprising a valve port with lift valve seated with excess of pressure in said shut-off chamber over that in said reservoir chamber, manual means for raising said lift valve from its seat, a check valve between said intermediate chamber and said pressure chamber, a check valve between said shut-off chamber and said intermediate chamber, said check valves and said lift valve opening in unison when the pressure in said pressure chamber is reduced below the pressure in said reservoir chamber, whereby the plunger may be pulled outwardly of the cylinder substantially freely.

16. A fluid governor comprising a pressure chamber, an intermediate chamber, and a third chamber, means for limiting the rate of fluid flow from said pressure chamber to said third chamber when the pressure in said pressure chamber exceeds the pressure in said third chamber, check valve means between said pressure chamber and said intermediate chamber opening upon excess of pressure in said intermediate chamber above that in said pressure chamber, and check valve means between said intermediate chamber and said third chamber opening upon excess of pressure in said third chamber above that in said intermediate chamber, both of said check valve means being adapted to permit free flow of fluid from said third chamber through said intermediate chamber into said pressure chamber.

17. The combination of claim 16 comprising a cylinder and a plunger, said plunger comprising a piston rod and a piston, said piston fitting in said cylinder, said pressure chamber and said third chamber being disposed in said cylinder on opposite sides of said piston, and said intermediate chamber and each of said check valve means being disposed in said plunger.

STEPHEN O. HARLAN.